(12) United States Patent
Bai et al.

(10) Patent No.: US 9,245,323 B2
(45) Date of Patent: Jan. 26, 2016

(54) MEDICAL DIAGNOSTIC DEVICE AND METHOD OF IMPROVING IMAGE QUALITY OF MEDICAL DIAGNOSTIC DEVICE

(75) Inventors: Jie Bai, Yokohama (JP); Kenji Nakahira, Fujisawa (JP); Atsushi Miyamoto, Yokohama (JP)

(73) Assignee: HITACHI MEDICAL CORPORATION, Tokyo (JP)

( * ) Notice: Subject to any disclaimer, the term of this patent is extended or adjusted under 35 U.S.C. 154(b) by 1363 days.

(21) Appl. No.: 12/936,769

(22) PCT Filed: Apr. 2, 2009

(86) PCT No.: PCT/JP2009/001552
§ 371 (c)(1),
(2), (4) Date: Jan. 25, 2011

(87) PCT Pub. No.: WO2009/128213
PCT Pub. Date: Oct. 22, 2009

(65) Prior Publication Data
US 2011/0125030 A1    May 26, 2011

(30) Foreign Application Priority Data
Apr. 14, 2008  (JP) ................. 2008-104631

(51) Int. Cl.
*A61B 6/00* (2006.01)
*G06T 5/00* (2006.01)
*G06T 5/30* (2006.01)

(52) U.S. Cl.
CPC . *G06T 5/002* (2013.01); *G06T 5/30* (2013.01); *G06T 2207/20036* (2013.01); *G06T 2207/20192* (2013.01)

(58) Field of Classification Search
None
See application file for complete search history.

(56) References Cited

U.S. PATENT DOCUMENTS 5,673,332 A * 9/1997 Nishikawa et al. ........... 382/128
5,937,111 A   8/1999 Yamada
5,970,164 A * 10/1999 Bamberger et al. .......... 382/128

(Continued)

FOREIGN PATENT DOCUMENTS

JP    03-100773    4/1991
JP    09-050522    2/1997

(Continued)

OTHER PUBLICATIONS

JP Office Action for Japanese Patent Application No. 2010-508100, issued on Jan. 22, 2013.

*Primary Examiner* — Unsu Jung
*Assistant Examiner* — Joseph M Santos Rodriguez
(74) *Attorney, Agent, or Firm* — Baker Botts L.L.P.

(57) ABSTRACT

A medical diagnostic device is characterized in that an image processing unit (22) includes an image noise removal part (211, 211') which removes the noise in the generated image of a person to be examined, a signal component enhancement processing part (212, 212') which generates an enhanced-signal component image by performing signal component enhancement processing of the image from which the noise is removed by the image noise removal part, and an image combining part (213, 213') which generates a combined image by combining the image of the person to be examined, the image from which the noise is removed by the image noise removal part, and an enhanced-signal component image subjected to signal component enhancement processing by the signal component enhancement processing part.

11 Claims, 11 Drawing Sheets

(56) References Cited

U.S. PATENT DOCUMENTS

| | | |
|---|---|---|
| 6,233,362 B1 | 5/2001 | Takeo et al. |
| 6,678,400 B1 | 1/2004 | Shinbata |
| 6,801,647 B1 * | 10/2004 | Arakawa ............... 382/132 |
| 6,937,772 B2 * | 8/2005 | Gindele ............... 382/240 |
| 2002/0159623 A1 | 10/2002 | Shinbata |
| 2003/0016855 A1 | 1/2003 | Shinbata |
| 2004/0042647 A1 | 3/2004 | Shinbata |
| 2005/0135665 A1 | 6/2005 | Shinbata |
| 2005/0220356 A1 | 10/2005 | Shinbata et al. |
| 2006/0110061 A1 | 5/2006 | Shinbata |
| 2006/0171601 A1 | 8/2006 | Shinbata |
| 2007/0145317 A9 * | 6/2007 | Kobayashi et al. ...... 251/129.15 |
| 2007/0188785 A1 | 8/2007 | Shinbata |
| 2007/0189391 A1 | 8/2007 | Shinbata |

FOREIGN PATENT DOCUMENTS

| | | |
|---|---|---|
| JP | 09-062836 | 3/1997 |
| JP | 09-248291 | 9/1997 |
| JP | 10-063836 | 3/1998 |
| JP | 2000-101841 | 4/2000 |
| JP | 2000-316090 | 11/2000 |
| JP | 2001-283215 | 10/2001 |
| JP | 2002-133399 | 5/2002 |
| JP | WO 02/45020 | 6/2002 |
| JP | 2002-253546 | 9/2002 |
| JP | 2005-296331 | 10/2005 |
| JP | 2006-34987 | 2/2006 |
| JP | 2006-034987 | 2/2006 |
| JP | 2007-268308 | 10/2007 |
| WO | WO 02/45020 | 6/2002 |

* cited by examiner (a)

| Photographing Condition | | Image Type | Photographing Subject | Image Characteristic | Processing Parameter | | |
|---|---|---|---|---|---|---|---|
| | | | | | Sharpening Processing Using Morphological Filter | | |
| Ultrasonic Probe | ... | | | | Structural Element Size | Parameter w1 | Parameter w2 |
| CONVEX | ... | B MODE | ABDOMINAL PART | HIGH FREQUENCY REGION | ... | ... | ... |
| CONVEX | ... | DOPPLER | ABDOMINAL PART | LOW FREQUENCY REGION | ... | ... | ... |
| CONVEX | ... | (ARBITRARY) | ABDOMINAL PART | ... | ... | ... | ... |
| ... | ... | ... | ... | ... | ... | ... | ... |
| (ARBITRARY) | ... | (ARBITRARY) | (ARBITRARY) | (ARBITRARY) | ... | ... | ... |

1202 — Photographing Condition
1203 — Image Type
1204 — Photographing Subject
1205 — Image Characteristic
1201 — Processing Parameter
1206 — Sharpening Processing Using Morphological Filter

MEDICAL DIAGNOSTIC DEVICE AND METHOD OF IMPROVING IMAGE QUALITY OF MEDICAL DIAGNOSTIC DEVICE

TECHNICAL FIELD

The present invention relates to a medical diagnostic device to obtain a signal reflected or transmitted from a person to be examined and generate an image, and more particularly to a medical diagnostic device having a function of improving image quality by performing image processing on an obtained photographed image and a method of improving image quality of the medical diagnostic device.

BACKGROUND ART

In recent years, with significant advancement of computer technology and electronics technology, the technology of medical imaging diagnostic device is rapidly improved. Various medical imaging diagnostic devices with different physical photographic principles (e.g., an ultrasonic diagnostic device, an X-ray device, a CT device and an MRI diagnostic device) have been developed and used in disease diagnosis in the respective purposes. In images photographed with these medical diagnostic devices, speckle noise due to dispersion and interference of signal in an heterogeneous medium in a living body, shot noise due to graininess of a transmission signal, electrical noise caused inside the device and the like are superposed. Further, in some cases, a high frequency component supposed to be originally obtained on the border of a tissue cannot be sufficiently obtained since the frequency band of a transmission/reception signal is narrow or for some other reasons. This may blur edges included in the image.

The noise superposition and edge blurring degrade image quality and have an adverse effect upon diagnosis. To suppress the noise and edge blurring and accurately read a significant structure of a morbid portion or the like, application of noise removal processing and signal component enhancement processing by image processing, in addition to improvement in hardware performance and signal transmission/reception system, are desired.

As noise removal by image processing applied to medical imaging, processing using a liner filter, a median filter and wavelet transformation are well known (Patent Documents 1 and 2).

On the other hand, as widely used signal component enhancement processing, generally, processing using an edge enhancing space filter such as a Laplacian filter, procesing of extracting a high frequency component and amplifying the extracted high frequency component thereby performing signal enhancement, and the like, can be given (Patent Documents 3 to 6).

In the image quality improvement methods described in the Patent Documents 1 to 6, only one of the noise removal processing and the signal component enhancement processing is performed. However, in the image quality improvement methods disclosed in the Patent Documents 7 and 8, the both noise removal processing and the signal component enhancement processing are performed.

In the conventional signal component enhancement processing using a Laplacian filter and the method of amplifying a high frequency component, generally, ringing occurs around an edge, which often degrades the image quality. On the other hand, in recent years, edge enhancement processing using a morphological filter attracts attention as processing capable of enhancing a signal component in addition to suppression of ringing around an edge. The method disclosed in the Patent Document 1 is one of such methods.

Patent Document 1: Japanese Published Unexamined Patent Application No. Hei 3-100773
Patent Document 2: Japanese Published Unexamined Patent Application No. 2002-133399
Patent Document 3: Japanese Published Unexamined Patent Application No. Hei 9-62836
Patent Document 4: Japanese Published Unexamined Patent Application No. Hei 9-50522
Patent Document 5: Japanese Published Unexamined Patent Application No. Hei 9-248291
Patent Document 6: Japanese Published Unexamined Patent Application No. Hei 10-63836
Patent Document 7: Japanese Published Unexamined Patent Application No. 2005-296331
Patent Document 8: Japanese Published Unexamined Patent Application No. 2001-283215
Patent Document 9: Japanese Published Unexamined Patent Application No. 2002-253546
Non-Patent Document 1: J. G. M. Schavemaker et al.: Image Sharpening by Morphological Filtering, Pattern Recognition, Vol. 33, pp. 997-1012 (2000)
Non-Patent Document 2: Daniel J. Jobson et al.: The Statistics of Visual Representation, Visual Information Processing XI, Proc. SPIE 4736, (2002)

DISCLOSURE OF THE INVENTION

Problem to be Solved by the Invention

However, in the image quality improvement methods described in the above-described documents, as given hereinafter, in some cases, the improvement is not sufficiently effective in a photographed image. The present invention has its object to achieve further improvement in image quality and provide a high performance image quality improvement means.

(1) The image quality improvement means described in the Patent Documents 1 to 6 performs only one of the noise removal processing and the signal component enhancement processing. Accordingly, only the effect by one of these processing is obtained. Further, edges are blurred when the noise removal processing is performed, or when the signal enhancement processing is performed, a noise component is also enhanced at the same.

As a method of performing the both noise removal processing and the signal component enhancement processing, the image quality improvement methods described in the Patent Documents 7 and 8 can be given.

According to the former method, in execution of image processing using wavelet transformation on a photographed image, the noise removal processing and the signal component enhancement processing can be simultaneously performed by degenerating an expansion coefficient after wavelet transformation and performing adaptive weighting processing on the high frequency component based on edge information obtained from the high frequency component of the wavelet transformation. However, generally, there is a limit in the same method to perform the both noise removal processing and the signal component enhancement processing to obtain excellent image quality improvement performance.

In the latter method, switching is performed between a high frequency enhancement filter for signal enhancement and a smoothing filter for noise removal by pixel of a photographed image. In this method, however, it is difficult to perform appropriate switching and smooth a border between these filters, and as a result, there is discontinuity in the image.

(2) As described above, in place of the conventional signal component enhancement method using a Laplacian filter and the method of amplifying a high frequency component, in recent years, edge enhancement processing using a morphological filter as described in the Non-Patent Document 1 attracts attention as processing capable of enhancing a signal component in addition to suppression of ringing around an edge. In this method, from dilated and eroded images obtained by using a morphological filter, regarding each pixel, a brightness value closer to an input image is determined as a brightness value of an output image. In the Non-Patent Document 1, an excellent signal component enhancement effect can be obtained from a document image as a subject. In a general medical image, however, a change of image brightness value on the border between a dilated image and an eroded image is discontinuous and a strange pattern occurs.

(3) In the image quality improvement, when processing is performed using the same parameter without consideration of photographing condition, a photographed subject, an image type, an image characteristic and the like, sufficient image quality cannot be obtained in some images. For example, in the signal component enhancement processing using a morphological filter, when a large structural element is used, an excellent effect of sharpening can be obtained with respect to a large pattern. However, a fine pattern is blurred and an unnatural image is obtained. On the other hand, when a small structural element is used, although a fine pattern shape can be kept natural, sufficient effect of sharpening cannot be obtained with respect to a large pattern.

Further, considering processing time, generally, there is a trade-off relationship between the processing time in the image quality improvement processing and the performance of image quality improvement. On the other hand, required processing time differs in accordance with inspection purpose. For example, in inspection of an active organ such as a heart, since it is necessary to observe a moving image at a high frame rate, processing with a small calculation amount is required. However, in inspection of a portion with slow temporal movement, it is impossible to obtain sufficient performance with simple processing with a small calculation amount.

It is difficult to obtain sufficient performance with the conventional methods due to the above-described problems (1) to (3).

Means for Solving the Problem

In the present invention, the above-described problems are solved by adopting an image quality improvement method as follows in a medical diagnostic device.

(i) First, the noise removal processing and the signal component enhancement processing are sequentially performed. In this manner, by performing the signal component enhancement processing on the noise-removed image, an edge blurred by the noise removal processing can be sharpened, and the signal component can be enhanced in addition to suppression of noise amplification.

Next, combining is performed by weighted addition of a photographed image, a noise removed image and a signal component enhanced image. It is possible to control the graininess of a medical image to an excellent percentage by combining of the photographed image. Further, it is possible to improve the effect of signal component enhancement while maintaining the excellent percentage of graininess by combining the noise removed image. Especially, by assuming that a value, obtained by subtracting the sum between a weight $w_x$ with respect to the photographed image and a weight $w_e$ with respect to the signal component enhanced image from a constant, is a weight $w_{deno}$ with respect to the noise removed image, it is possible to maintain a brightness level equivalent to that of the photographed image.

Further, in combining, it is possible to perform appropriate processing by image by calculating an index representing an image naturalness based on an index representing the graininess and an index representing the intensity of artifact, and automatically controlling the degree of noise suppression and the degree of signal component enhancement based on the calculated index.

(ii) The method using a morphological filter described in the Non-Patent Document 1 is improved so as to obtain an excellent effect of signal component enhancement in addition to suppression of ringing. In the improved method of the present invention, a dilated image and an eroded image are obtained by using a morphological filter, then in combining these images, smooth connection is realized by continuously interpolating a portion where a strange pattern may occur and its peripheral portion.

(iii) Processing parameters are set in correspondence with photographing condition, photographed subject, image type and image characteristic so as to obtain high performance high image quality effect and appropriate image display speed.

Regarding acquisition of a high performance image quality effect, by selecting the size of structural element used in edge enhancement processing with a morphological filter using e.g. information on a frequency characteristic in a local region, it is possible to achieve high performance signal enhancement while maintain naturalness.

Regarding acquisition of appropriate image display speed, processing parameters to obtain maximum performance image quality of moving image and at the same time not reduce the display speed are used with respect to an image display speed determined based on photographing condition, image type, photographed subject and image characteristic.

As a parameter to control the trade-off between image quality and processing time, for example, whether or not the selection of size of structural element is performed by position as described above with respect to all the frame images, whether or not time-sequential image frame information is utilized, or the like, can be given. A high-speed and high-performance image quality improvement can be realized by such parameter selection.

Effects of the Invention

As described above, according to the present invention, it is possible to improve the visibility of a tissue structure or morbid portion while maintain naturalness by appropriately combining the noise removal processing and the signal component enhancement processing and by effectively combining a photographed image, a noise removed image and a signal component enhanced image.

Further, it is possible to achieve high speed processing and high image quality in correspondence with purpose by selecting processing parameters in accordance with photographing condition, photographed subject, image type and image characteristic.

BEST MODE FOR CARRYING OUT THE INVENTION

Hereinafter, embodiments of the present invention will be described in accordance with the accompanying drawings.

The present invention relates to a medical diagnostic device which sequentially performs noise removal processing and signal component enhancement processing on a photographed image obtained by photographing a person to be examined, then, combines the results of the respective processing thereby improves the image quality, then processes the image with improved image quality and performs medical diagnosis.

The embodiments of the present invention will be described using FIGS. 1 to 9.

FIG. 1(a) is a flowchart showing the flow of processing in the medical diagnostic device according to the present invention.

In the medical diagnostic device according to the present invention, first, a person to be examined is photographed (S11), then image quality improvement processing is performed on an image of the person to be examined obtained by photographing (S12), then image processing (post processing) is performed (S13) using the image with image quality improved by the image quality improvement processing, and information obtained by the image processing is displayed on a display screen or the like or transmitted to a host information management system (S14).

Next, FIG. 1(b) shows an embodiment of a processing flow in the image quality improvement processing at the above-described step S12. First, the noise removal is performed by noise removal processing 101 on a photographed image x, to obtain a noise removed image $y_{deno}$. The photographed image x is a vector having a scalar value x[m,n] with respect to each position (m, n). Next, the signal component enhancement is performed by the signal component enhancement processing 102 on the noise removed image $y_{deno}$, to obtain a signal component enhanced image $y_e$. Finally, the photographed image x and the noise removed image $Y_{deno}$ are combined with the signal component enhanced image $y_e$ by signal combining processing 103, to obtain an image quality improved image y. Similarly to the photographed image x, the image quality improved image y, the signal component enhanced image $y_e$ and the noise removed image $y_{deno}$ are vectors having a scalar value with respect to each position (m,n).

Next, the configuration of the medical diagnostic device in the present invention will be described using FIGS. 2A and 2B.

FIG. 2A shows an example of the configuration of the medical diagnostic device which processes a signal transmitted from a person to be examined such as an MRI diagnostic device, an X-ray device or a CT device. A medical diagnostic device 201 briefly has a photographing means 21 to photograph a person to be examined to obtain an image, an image processing means 22 to process the obtained image, an image display means 23 to display the processed image, and a control means 24 to control the entire device including the photographing means 21, the image processing means 22 and the image display means 23.

The photographing means 21 has a transmission sensor 203 to convert an electric signal into an electromagnetic wave, an X-ray or the like and transmit the converted signal, a transmission circuit part 202 to generate a drive signal to the transmission sensor, a reception sensor 204 to detect an electromagnetic wave, an X-ray or the like transmitted from a person to be examined 200 and convert the detected electromagnetic wave, X-ray or the like into an electronic signal, a reception circuit part 205 to perform amplification and/or A/D conversion on the signal detected by the reception sensor, and an image generation part 206 to generate an image having a two-dimensional array of one-dimensional electronic signals.

The image processing means 22 has an image data storage part 207 to hold a large amount of image data, an image data I/O control part 208 to control access to the image data storage part 207, and an image data processing unit 209 to process image data obtained from the image data I/O control part 208.

The image display means 23 has a scanning conversion part 215 to convert the processed image data obtained through the image I/O control part 208 to a predetermined display format, and an image display part 217 to display the image.

Further, the control means 24 has an input part 218 to input photographing conditions and various processing parameters from a user, and a system control part 216. The system control part 216 performs total management of the transmission circuit part 202, the reception circuit part 205, the image generation part 206, the image data I/O control part 208, and the input part 218.

On the other hand, FIG. 2B shows an example of the configuration of the medical diagnostic device to process a signal reflected from a person to be examined such as an ultrasonic diagnostic device. In comparison with FIG. 2A, a transmission/reception part in FIG. 2B is different from that in FIG. 2A. In place of the configuration as a combination of transmission circuit part 202, the transmission sensor 203, the reception sensor 204 and the reception circuit part 205 in FIG. 2A, the system shown in FIG. 2B has a transmission/reception sensor 219 and a transmission/reception circuit part 220.

Among the constituent elements shown in FIG. 2B, constituent elements having almost the same functions as those of the constituent elements shown in FIG. 2A to substantially perform the same processing have same reference numerals with an apostrophe (').

Hereinafter, an application of the present invention to the medical diagnostic device to process a signal transmitted from a person to be examined such as an MRI diagnostic device, an X-ray device or a CT device will be described based on the configuration in FIG. 2A. In the following description, in a case where the image generation part 206 is replaced with an image generation part 206', the description will be made about the system shown in FIG. 2B.

It may be arranged such that in the image generation part 206, positional correction is performed such that an image obtained by transmission/reception in continuous time frames and a display position of a tissue correspond with each other.

In the configuration shown in FIG. 2A, the image quality improvement processing described in FIG. 1(b) is performed as follows. The noise removal processing 101 is performed with the noise removal part 211 of the image data processing unit 209, the signal component enhancing processing 102 is performed with the signal component enhancing part 212, and the signal combining processing 103 is performed with the signal combining part 213.

The preprocessing part 210 and the post processing part 214 in the image data processing unit 209 perform other processing than the image quality improvement processing. For example, in an ultrasonic diagnostic device, when an ultrasonic probe as the ultrasonic wave transmission/reception sensor 219 is a convex type device, scan conversion to convert a rectangular image into a fan-shaped image may be performed.

The system control part 216 controls the operations of the transmission/reception circuit part 220, the image generation part 206, the image data I/O control part 208, the scanning conversion part 215 and the like.

In the present embodiment, the noise removal processing 101 performed with the noise removal part 211 is executed by using any of the processing using a linear filter, a median filter, and wavelet transformation as disclosed in the Patent Document 1 or 2 described in the background art.

Next, signal combining processing 103-1 and 103-2 (hereinafter, when processing substantially the same as the signal combining processing in FIG. 1 is performed, serial numbers are added to "103" with a hyphen) performed with the signal combining part 213 will be described using FIGS. 3(a) and 3(b). FIG. 3(a) shows an embodiment of the flow of combining processing of the signal component enhanced image $y_e$, the photographed image x and the noise removed image $y_{deno}$ in the present invention. The combining is performed by weighted addition 301 of the signal component enhanced image $y_e$, the photographed image x and the noise removed image $y_{deno}$. The respective weight coefficients for the images $y_e$, x and $y_{deno}$ are $w_e$, $w_x$ and $w_{deno}$. The image quality improved image y is calculated with the following expression (1).

[Expression 1]

$$y[m,n] = w_e \cdot y_e[m,n] + w_x \cdot x[m,n] + w_{deno} \cdot y_{deno}[m,n] \qquad (1)$$

FIG. 3(b) shows another embodiment. When a noise image $y_n$ is generated by differential processing 302 between the photographed image x and the noise removed image $y_{deno}$, combining of the signal component enhanced image ye, the photographed image x and the noise image $y_n$ is performed by weighted addition 303 using weight coefficients $w'_e$, $w'_x$ and $w'_n$. In the case of this processing, the image quality improved image y is calculated with the following expressions (2) and (3).

[Expression 2]

$$y[m,n] = w'_e \cdot y_e[m,n] + w'_x \cdot x[m,n] + w'_n \cdot y_n[m,n] \qquad (2)$$

[Expression 3]

$$y_n[m,n] = x[m,n] - y_{deno}[m,n] \qquad (3)$$

The combining after the extraction of the noise image $y_n$ as the embodiment in FIG. 3(b) has an advantage that the degree of noise suppression can be easily controlled.

In FIG. 3(a), the advantage equivalent to that in FIG. 3(b) can be obtained by setting the weights $w_e$, $w_x$ and $w_{deno}$ as $w_e = w_e$, $w_x = w'_x + w'_n$, an $w_{deno} = -w'_n$. A mean brightness level of the image quality improved image y can be controlled with the sum of the weight $w_e'$ and the weight $w_x'$, i.e. the sum of the weights $w_x$, $w_n$ and $w_e$. Accordingly, by setting the weights such that $w_x + w_n + w_e$ becomes a constant, a constant brightness level of the image quality improved image y can be maintained. Especially, when $w_x + w_n + w_e$ is a value close to "1", the mean brightness level of the image quality improved image y can be controlled in correspondence with the photographed image x. Further, the intensity of graininess can be controlled by controlling the weight $w_n'$.

In the embodiments of FIGS. 3(a) and 3(b), the combining is performed by summation. However, the combining may be performed by using another calculation.

Next, an embodiment where the degree of noise suppression or the degree of signal component enhancement is automatically controlled in correspondence with an evaluation value representing image naturalness in the present invention will be described using FIG. 4.

Weighted addition 401 by signal combining processing 103-3 shown in FIG. 4(a) and weighted addition 407 by signal combining processing 103-4 shown in FIG. 4(b) correspond to 301 in FIG. 3(a) or a combination of 302 and 303 in FIG. 3(b).

FIG. 4(a) shows an embodiment of a processing flow to automatically control the weight of weighted addition in accordance with the image naturalness. In this processing, using naturalness calculated by naturalness calculation 402 from the signal component enhanced image $y_e$, the photographed image x and the noise removed image $y_{deno}$, it is determined at 403 step whether or not it is necessary to perform weight correction by a comparison between the naturalness of the respective images $y_e$, x and $y_{deno}$ and previously set respective reference values for the respective images. Then when it is determined that it is necessary to perform weight correction, the weight coefficients $w_e$, $w_x$ and $w_{deno}$ of the corrected images $y_e$, x and $y_{deno}$ obtained by weight correction 404 are fed back to the weighted calculation 401, to perform the weighted addition 401 again. The processing from 401 to 404 is repeated until it is determined at 403 step that it is not necessary to perform the weight correction. The result of weighted addition when it is determined that it is not necessary to perform the weight correction is the image quality improved image y.

The image naturalness is a psychological concept, and its subjective evaluation can be quantified and represented by an objective evaluation measure. For example, the objective evaluation measure to indicate the naturalness of a medical image can be represented as a combination of objective evaluation parameters indicating the gradation, sharpness and graininess of an image and intensity of artifact characteristic of a medical image and the like. As an example of the combination, the naturalness may be obtained by weighted addition of those objective evaluation parameters, or may be obtained by using a more complicated calculation expression.

The objective evaluation parameters can be calculated by various methods and the proposed existing methods can be employed. For example, as an objective evaluation parameter indicating gradation, contrast is obtained by using standard deviation of the brightness value in a local region of an image as disclosed by Daniel J. Jobson et al.: The Statistics of Visual Representation, Visual Information Processing XI, Proc. SPIE 4736, (2002) (Non-Patent Document 2). As an objective evaluation parameter indicating the graininess, an evaluation value such as RMS graininess or Wiener spectrum value may be used. An objective evaluation parameter indicating the intensity of artifact may be calculated by using e.g. the method disclosed in Japanese Published Unexamined Patent Application No. 2002-253546 (Patent Document 9).

FIG. 4(b) shows an embodiment of another processing flow. In this embodiment, the weights are obtained by weight calculation 406 using the naturalness calculated by naturalness calculation 405. Then the image quality improved image y is obtained by weighted addition 407 utilizing the obtained weights.

Next, the sharpening processing as an embodiment of the signal component enhancement processing will be described using FIGS. 5 to 7.

FIG. 5 shows an embodiment of a processing flow of the sharpening processing. In the present invention, the sharpening processing is performed by using a morphological filter. A dilated image $y_{dil}$ and an eroded image $y_{ero}$ are generated respectively by dilation processing 501 and erosion processing 502 with respect to the noise removed image $y_{deno}$, then a sharpened image $y_s$ is obtained by weighted addition 503 with an expression (6). The dilated image $y_{dil}$ and an eroded image $y_{ero}$ are respectively calculated with the following expressions (4) and (5).

[Expression 4]

$$y_{dil}[m,n] = \max_{k,l}[y_{deno}[m+k, n+l] + g[-k,-l]] \qquad (4)$$

[Expression 5]

$$y_{ero}[m,n] = \min_{k,l}[y_{deno}[m+k, n+l] + g[k,l]] \qquad (5)$$

Note that g is a vector referred to as a structural element representing a filter coefficient of the morphological filter.

The dilation processing and the erosion processing using the morphological filter will be described using FIG. 6. The sharpening processing will be described using FIG. 7.

FIG. 6 shows an example applied to a one-dimensional waveform in a cross section within an image. When the structural element g denoted by numeral 602 is moved so as to be in contact with an input waveform 601 from a position below, an erosion waveform 603 is generated with a locus drawn with the center point of the structural element g. When a structural element −g denoted by numeral 604 is moved so as to be in contact with the input waveform 601 from a position above, the center point of a dilation waveform 605 is generated with a drawn locus.

Next, the sharpening processing will be described using FIG. 7. FIG. 7 shows an example applied to a one-dimensional waveform in a cross section within an image. A graph 701 indicates an embodiment of the sharpening method to smoothly perform switching from the brightness value of a dilation waveform to the brightness value of an erosion waveform by weighted addition between the brightness value of the dilation waveform and the brightness value of the erosion waveform.

First, the dilation processing and erosion processing are performed with respect to an input waveform 703, thereby a dilation waveform $y_{dil}$ denoted by numeral 706 and an erosion waveform $y_{ero}$ denoted by numeral 705 are obtained. Then one of the brightness values of the dilation waveform and the erosion waveform closer to the brightness value of the input waveform is determined as the brightness value of an output waveform.

To smooth the switching from the brightness value of the dilation waveform to the brightness value of the erosion waveform, the weighted addition is performed using an index $w_{dil}$ indicating the degree of dilation and an index $w_{ero}$ indicating the degree of erosion.

[Expression 6]

$$y_s[m,n] = w_{dil} \cdot y_{dil}[m,n] + w_{ero} \cdot y_{ero}[m,n] \quad (6)$$

As the index $w_{dil}$ indicating the degree of dilation and the index $w_{ero}$ indicating the degree of erosion, the values in the following expressions (7) to (9) are used.

[Expression 7]

$$w_{ero} = 1 - w_{dil} \quad (7)$$

[Expression 8]

$$w_{dil} = \begin{cases} 1 & (w \geq w_2) \\ \dfrac{w - w_1}{w_2 - w_1} & (w_1 \leq w < w_2) \\ 0 & (w < w_1) \end{cases} \quad (8)$$

[Expression 9]

$$w = \frac{y_{deno} - y_{ero}}{y_{dil} - y_{ero}} \quad (9)$$

Note that by setting of the parameters $w_1$ and $w_2$, an output image is divided into three regions as a region [A] where the brightness value of the dilated image is the brightness value of the output image, a region [C] where the brightness value of the eroded image is the brightness value of the output image, and an interpolation region [B] to realize smooth connection. Accordingly, the parameters $w_1$ and $w_2$ are used as parameters for control of the switching from the region [C] to the region [A], and from the region [B] to the region [A]. The degree of sharpness and the like can be controlled by controlling the parameters, and an output waveform 704 can be obtained.

A graph 702 shows an example of the indices $w_{ero}$, $w_{dil}$ and w. Numeral 707 denotes the index w; 708 denotes the index $w_{dil}$; and 709 denotes the index $w_{ero}$. In the present embodiment, the sharpened image $y_s$ is obtained with the expression (6). However, the sharpened image $y_s$ may be obtained with other calculation.

Next, edge extraction processing available as a part of the signal component enhancement processing will be described using FIG. 8.

In the present embodiment, a narrow-width edge image $y_{edge}$ with high brightness is generated by top-hat conversion 801 using a morphological filter. First, the erosion processing is performed on the noise removed image $y_{deno}$ or the sharpened image $y_s$ by erosion processing 802, then dilation processing 803 is performed on the eroded image $y_{ero}$, thereby an opening image $y_{opening}$ a opening is generated. The edge image $y_{edge}$ can be extracted by processing 804 to subtract the opening image $y_{opening}$ from the input image.

In the signal component enhancement processing in the present invention, only the sharpening processing may be performed, or the signal component enhancement processing may include the edge extraction processing. Further, different two or more types of processing may be combined. The latter case will be described using FIGS. 9A and 9B. FIG. 9A (a) and (b), and FIG. 9B (a) and (b) show examples of processing flows of four types of combinations of the sharpening processing and other enhancement processing.

FIG. 9A (a) shows an example of a processing flow in signal component enhancement processing 102-1 (hereinafter, when processing substantially the same as the signal component enhancement processing 102 in FIG. 1 is performed, serial numbers are added to "102" with a hyphen). In the present example, sharpening processing 901 and edge extraction processing 902 are performed in parallel. That is, the sharpening processing 901 is performed on the noise removed image $y_{deno}$, thereby the sharpened image $y_s$ is obtained. Further, the edge extraction processing 902 is performed on the noise removed image $y_{deno}$, thereby the edge image $y_{edge}$ is extracted.

Next, the edge image $y_{edge}$ and the sharpened image $y_s$ are combined by edge component combining processing 903, thereby the signal component enhanced image $y_e$ is obtained. For example, in the edge component combining processing, the signal component enhanced image is calculated with the following expression (10). For example, a weight $w_{edge}$ may be a fixed value or variable by position.

[Expression 10]

$$y_e[m,n] = y_s[m,n] + w_{edge} \cdot y_{edge}[m,n] \quad (10)$$

In the processing flow in signal component enhancement processing 102-2 shown in the flowchart in FIG. 9A (b), the sharpening processing 901 and the edge extraction processing 904 are performed in series. That is, the sharpening processing 901 is performed on the noise removed image $y_{deno}$ thereby the sharpened image $y_s$ is obtained.

Then, the edge extraction processing 904 similar to 902 is performed on the sharpened image $y_s$, thereby the edge image $y_{edge}$ is obtained. Finally, the signal component enhanced image $y_e$ is obtained by edge component combining 905.

In the processing flow in signal component enhancement processing 102-3 shown in the flowchart in FIG. 9B (a), the sharpening processing 901 and contrast correction processing 906 are performed in parallel. That is, the sharpening processing 901 is performed on the noise removed image $y_{deno}$, thereby the sharpened image $y_s$ is obtained. On the other hand, the contrast correction processing 906 is performed on the noise removed image $y_{deno}$. In the contrast correction processing 906, global contrast correction may be performed, or local contrast correction may be performed, or further, these processing steps may be combined.

Next, a contrast corrected image $y_c$ and the sharpened image $y_s$ are combined by signal enhancement combining processing 907, thereby the signal component enhanced image $y_e$ is obtained. In the signal enhancement combining processing, the signal component enhanced image $y_e$ is obtained with the following expression (11).

[Expression 11]

$$y_e[m,n]=w_s \cdot y_s[m,n]+w_c \cdot y_c[m,n] \quad (11)$$

In the processing flow in signal component enhancement processing 102-4 shown in the flowchart in FIG. 9B (b), the sharpening processing 901 and contrast correction processing 908 are performed in series. That is, first, the sharpening processing 901 is performed on the noise removed image $y_{deno}$, thereby the sharpened image $y_s$ is obtained. Then the contrast correction processing 908 similar to 906 is performed on the sharpened image $y_s$, thereby the contrast corrected image $y_c$ is generated. Finally, the signal component enhanced image $y_e$ is obtained by signal enhancement combining processing 909.

Next, the image quality improvement processing where processing parameters are variable in accordance with image photographing information will be described using FIGS. 10 to 12.

FIG. 11 shows an example of a flow of the image quality improvement processing in the present invention. First, the processing parameters are determined by internal processing parameter determination processing 1101 based on the image photographing condition, the image type, and the photographed subject as the image photographing information. The processing parameters by image photographing information are previously prepared in a table. Further, it is possible to provide a function 1102 of obtaining external parameters which can be controlled by a user based on the processing parameters obtained from the table.

Next, noise removal processing 101-1, signal component enhancement processing 102-5 and signal combining processing 103-5 are performed using the determined processing parameters. Note that it may be arranged such that an employed method is changed by processing parameter so as to use different processing algorithm in accordance with processing parameter.

FIG. 12 shows an example of a table 1201 holding the processing parameters for respective items of image photographing information in the ultrasonic medical diagnostic device, used in the internal processing parameter determination processing 1101 and the external parameter determination processing 1102 in FIG. 11. The values in the table 1201 may be previously prepared based on outputs from the internal processing parameter determination processing 1101, or values may be inputted or selected by the user through an interface by the external processing parameter acquisition processing 1102.

In the table 1201, each line represents processing parameters used in each image photographing information. The image photographing information includes a photographing condition in a column 1202, a image type in a column 1203, a photographed subject in a column 1204 and an image characteristic in a column 1205. Regarding the photographing condition, e.g., in the case of ultrasonic wave, the type of an ultrasonic probe, a display scale, a frequency band used for an ultrasonic transmission/reception signal, application/non-application of spatial compound method, application/non-application of frequency compound method, scanning pitch of ultrasonic transmission signal, and the like, can be given. As the processing parameters, a parameter in a column 1206 for sharpening processing using a morphological filter, parameters for noise removal processing, signal component enhancement processing and signal combining processing, and the like, can be given.

In the present embodiment, among the lines in the table corresponding to the image photographing information, the processing parameters in the top line are applied. As an example of changing a structural element in correspondence with image characteristic, FIG. 10 shows an example of a one-dimensional waveform in a cross section within an image. The vertical axis indicates image brightness, and the lateral axis indicates position. With respect to a fine pattern image including many high frequency components, a small structural element 1002 is used so as not to lose image naturalness. On the other hand, with respect to a pattern not including many low frequency components, a large structural element 1001 is used so as to obtain high sharpening effect.

Brief Description of Drawings

[FIG. 12] A diagram showing a table showing the processing parameters corresponding to the respective photographing conditions, image types, photographed subjects and image characteristics.

Explanation of Reference Numerals

Figure 1:
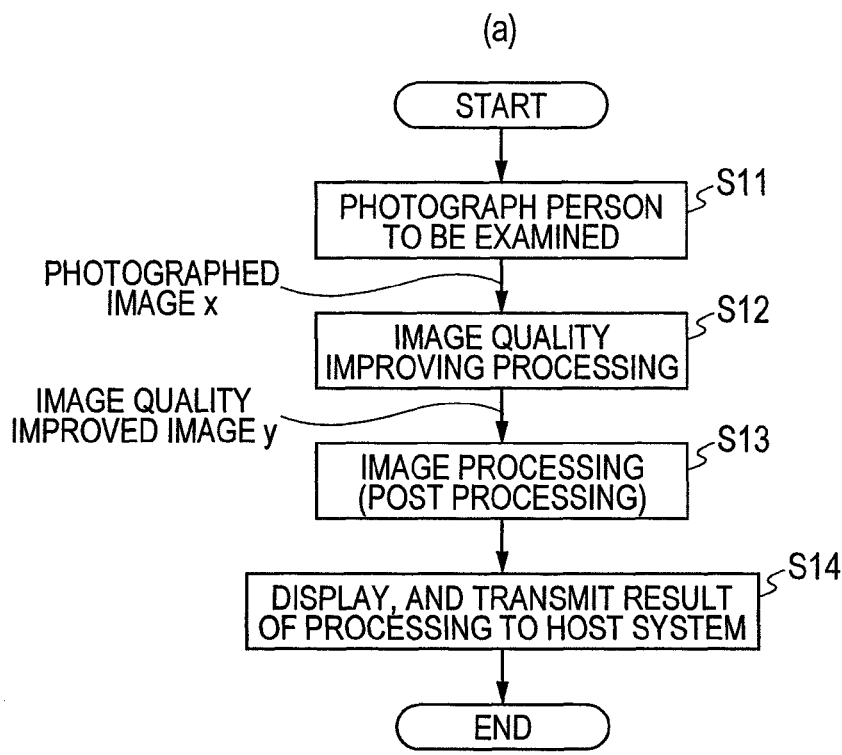
[FIG. 1] A diagram showing a flow of processing in a medical diagnostic device according to an embodiment of the present invention and a flowchart showing image quality improvement processing.
Figure 1:
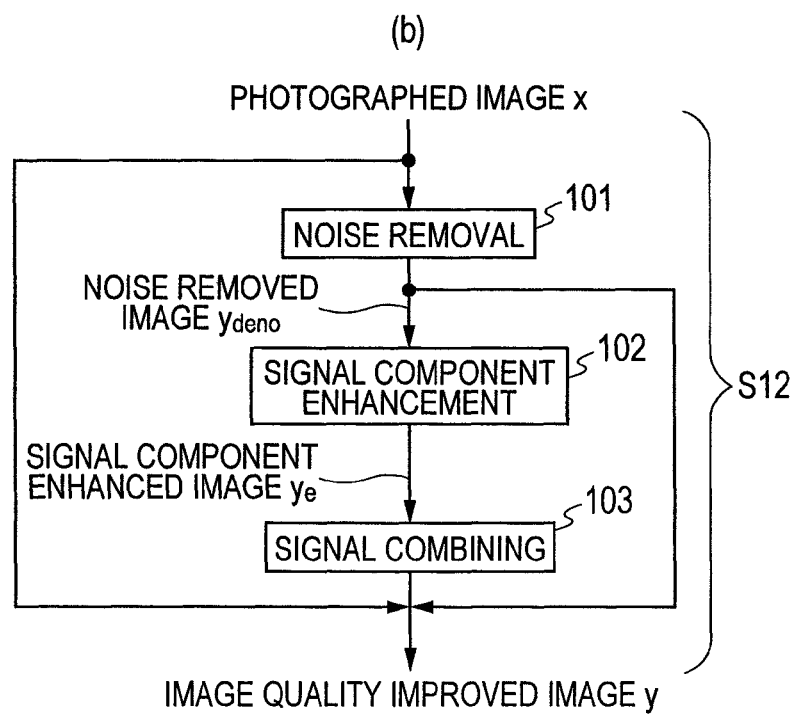
Figure 2A:
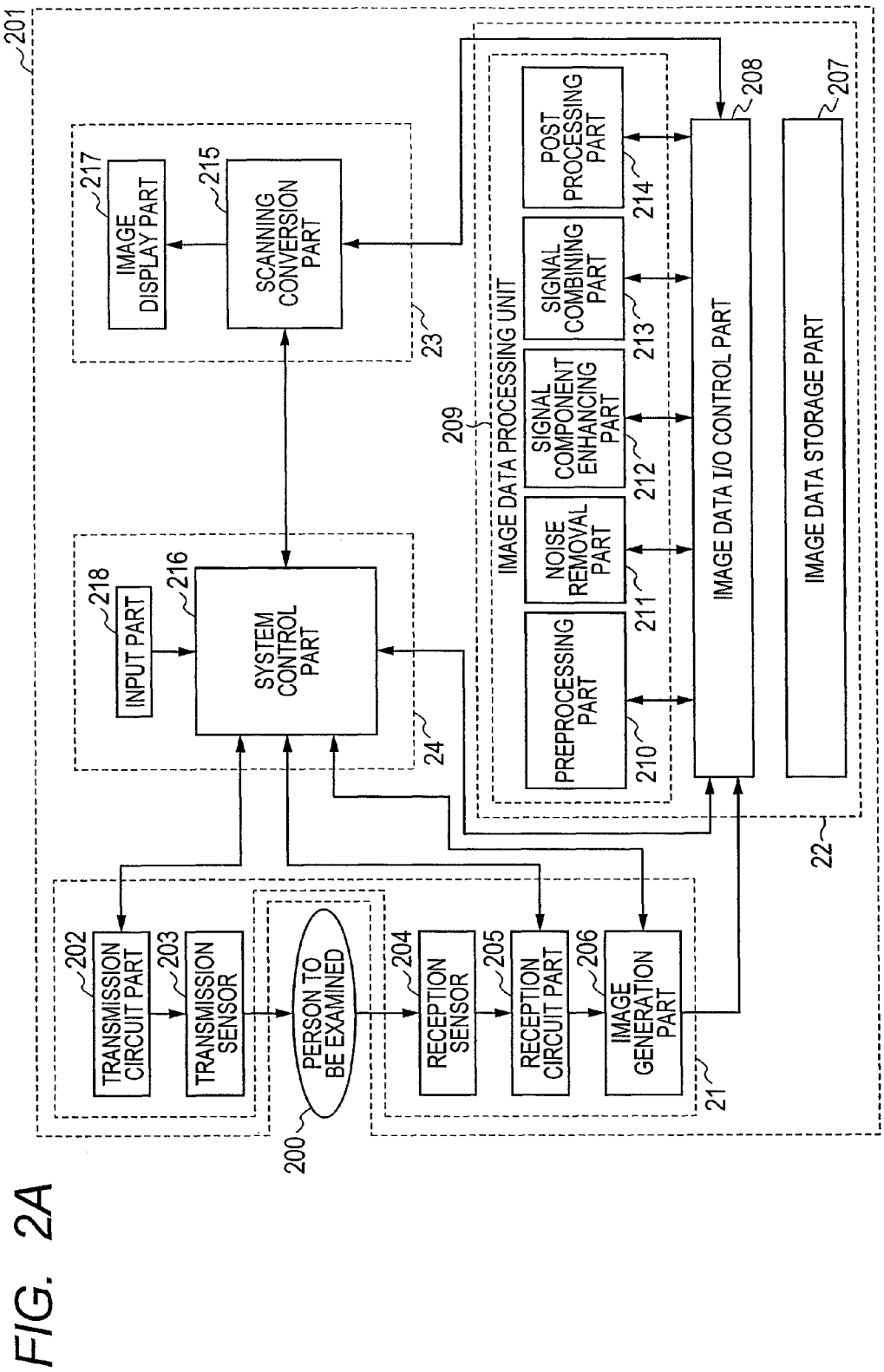
[FIG. 2A] A block diagram showing a configuration of the medical diagnostic device to handle a signal transmitted from a person to be examined such as an MRI diagnostic device, an X-ray device or a CT device in an embodiment of the present invention.
Figure 2B:
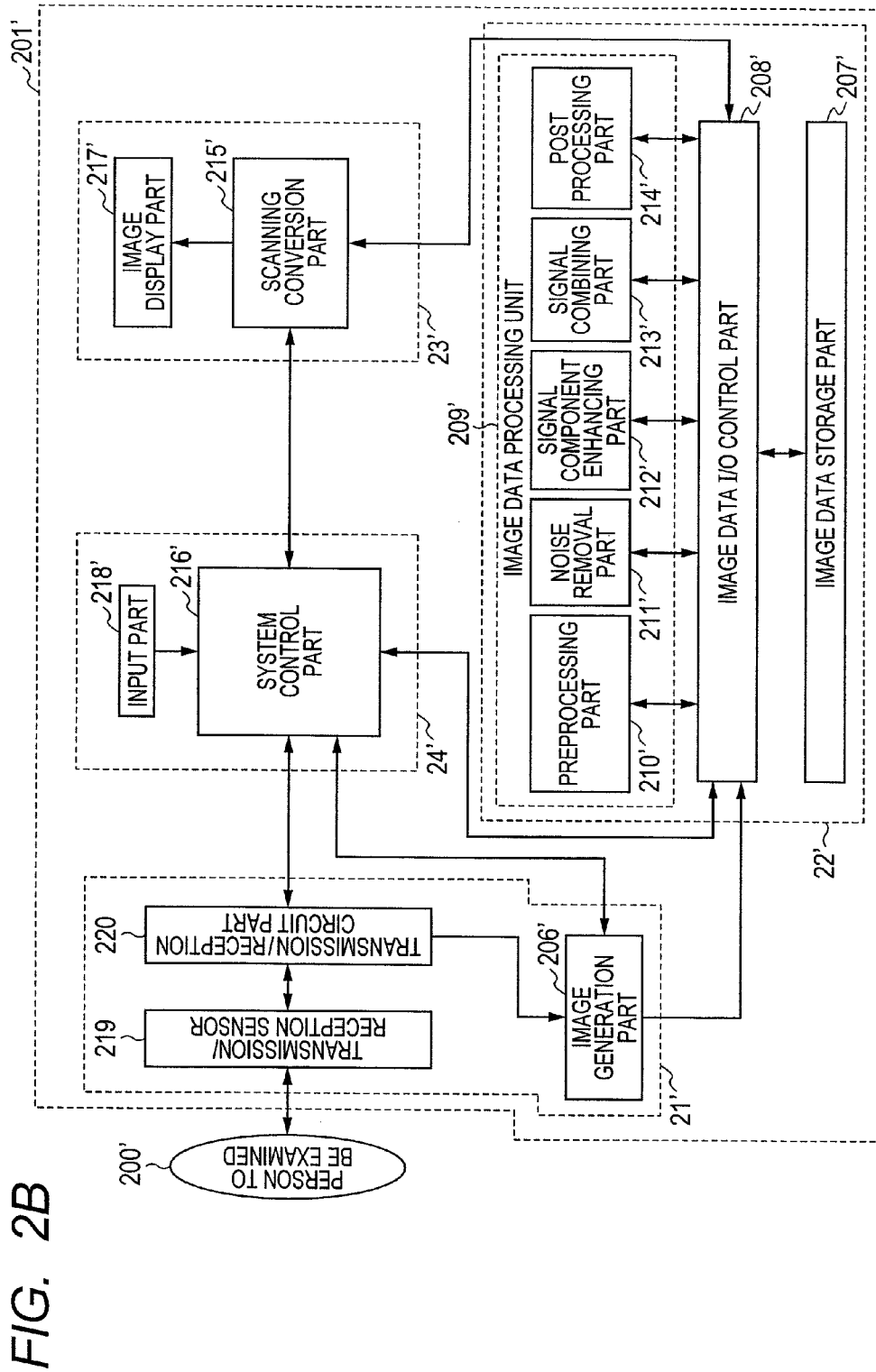
[FIG. 2B] A block diagram showing a configuration of the medical diagnostic device to handle a signal reflected from a person to be examined such as an ultrasonic diagnostic device in an embodiment of the present invention.
Figure 3:
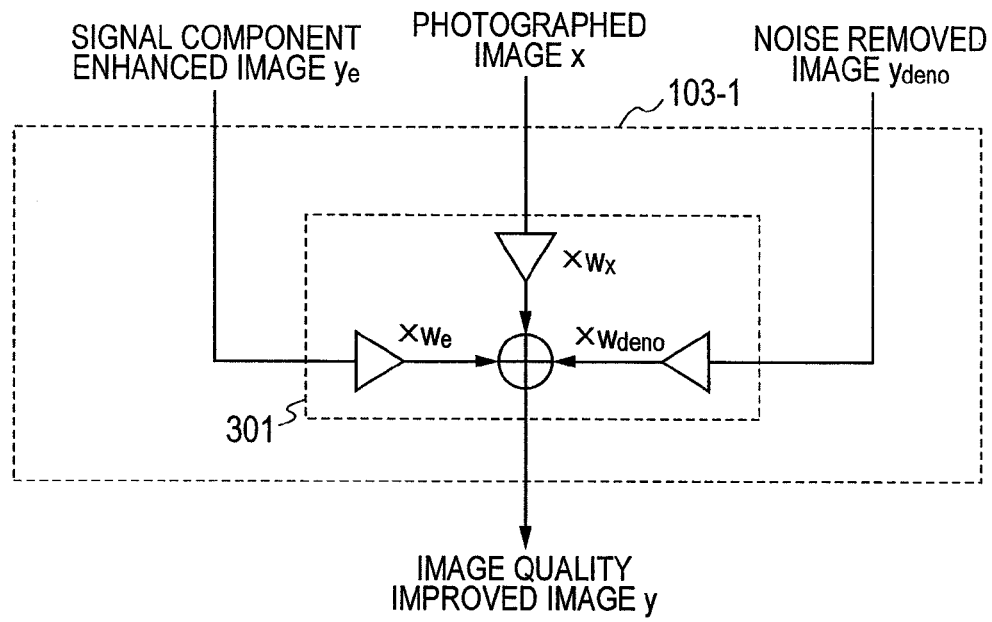
[FIG. 3] A diagram showing a flow of signal combining processing.
Figure 3:
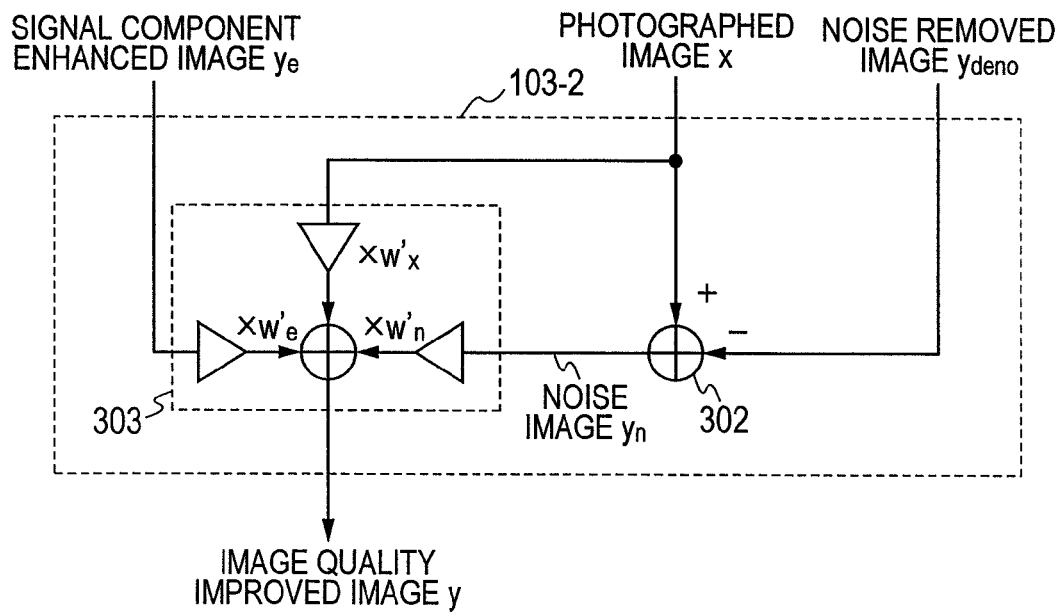
Figure 4:
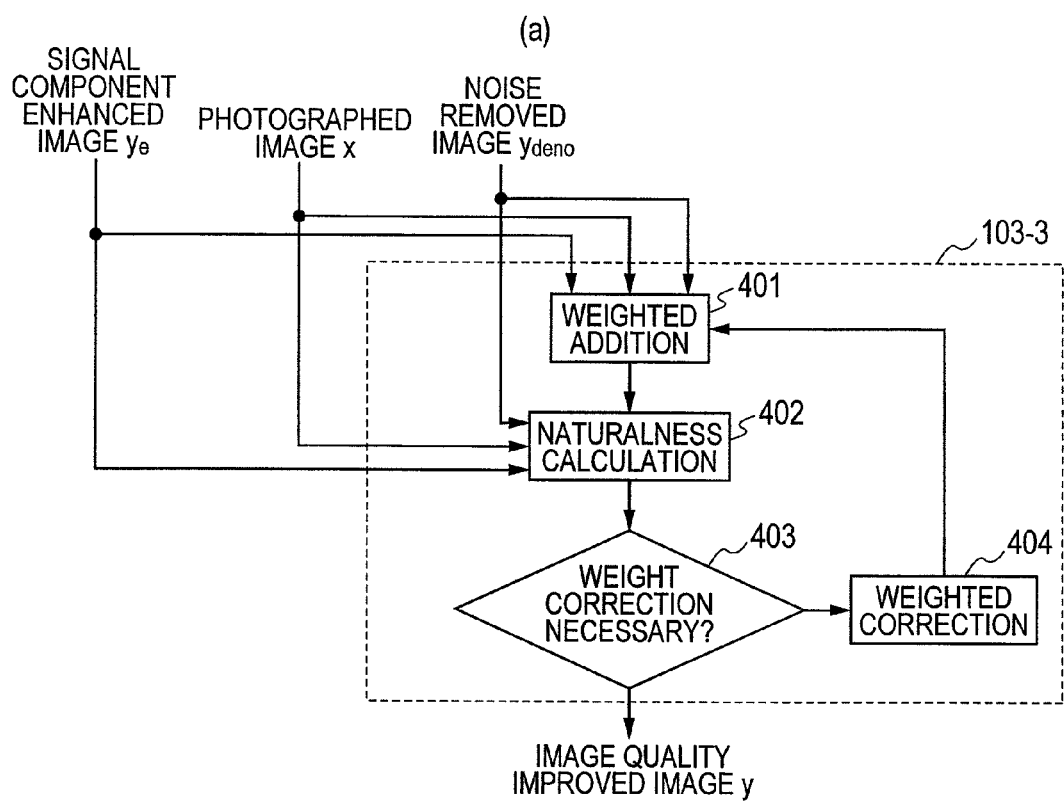
[FIG. 4] A diagram showing a processing flow of weighted addition based on calculation of naturalness.
Figure 4:
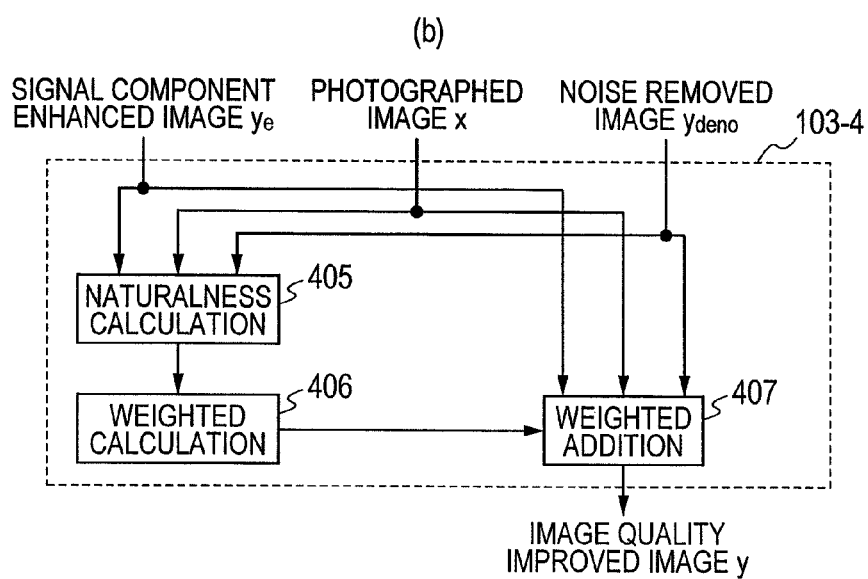
Figure 5:
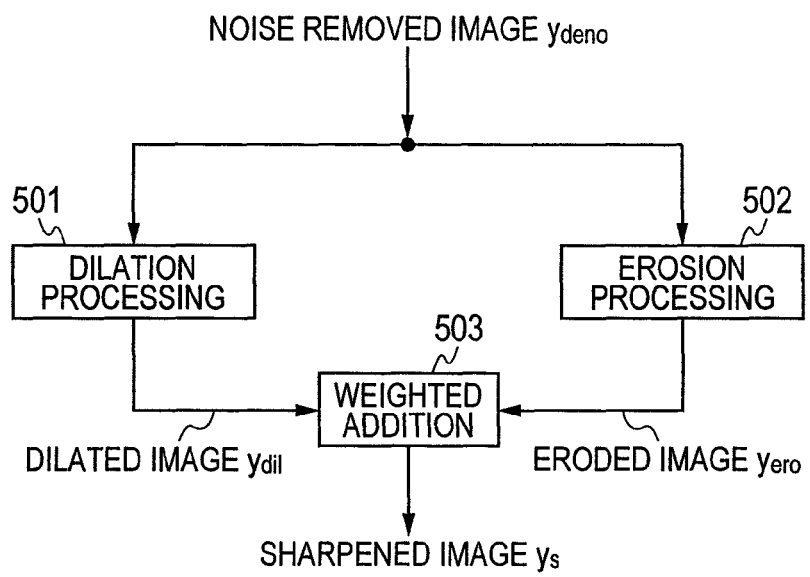
[FIG. 5] A flow diagram showing a flow of sharpening processing using a morphological filter.
Figure 6:
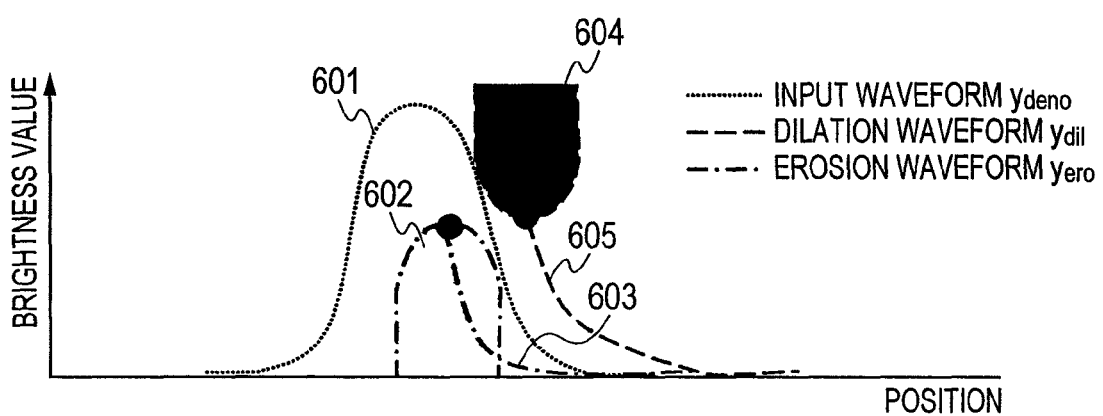
[FIG. 6] An explanatory diagram of dilation processing and erosion processing using the morphological filter.
Figure 7:
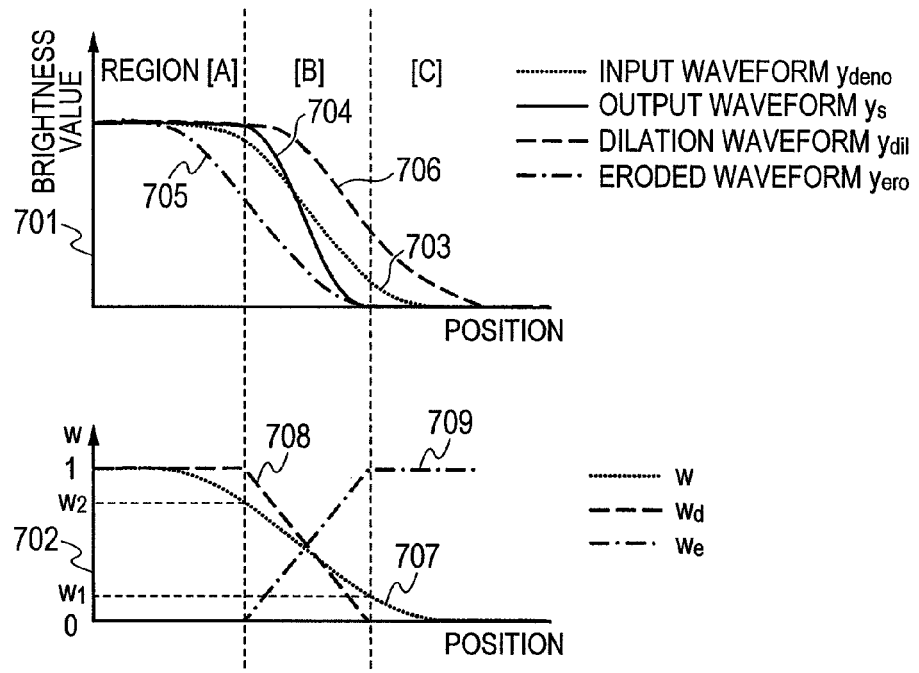
[FIG. 7] An explanatory diagram of the sharpening processing.
Figure 8:
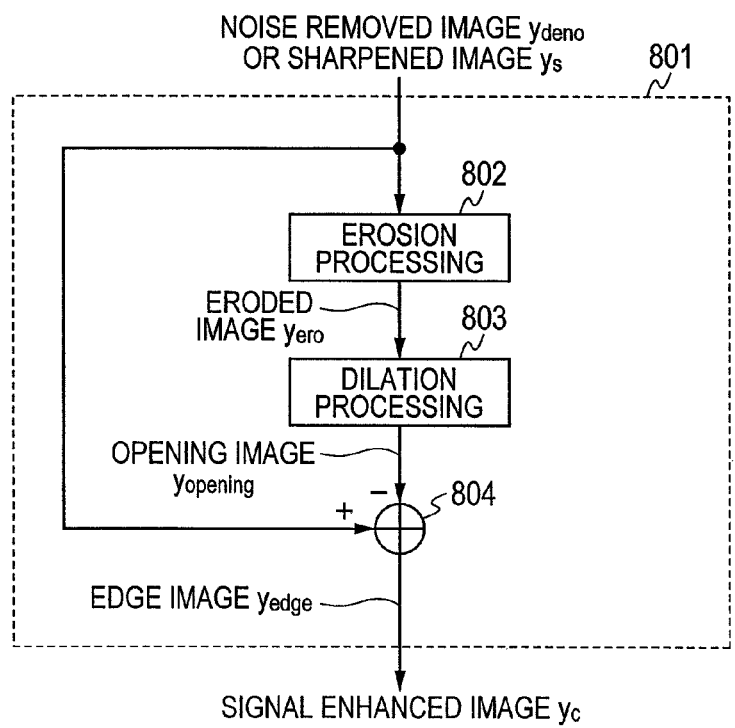
[FIG. 8] A diagram showing a flow of edge extraction processing by top-hat conversion using the morphological filter.
Figure 9A:
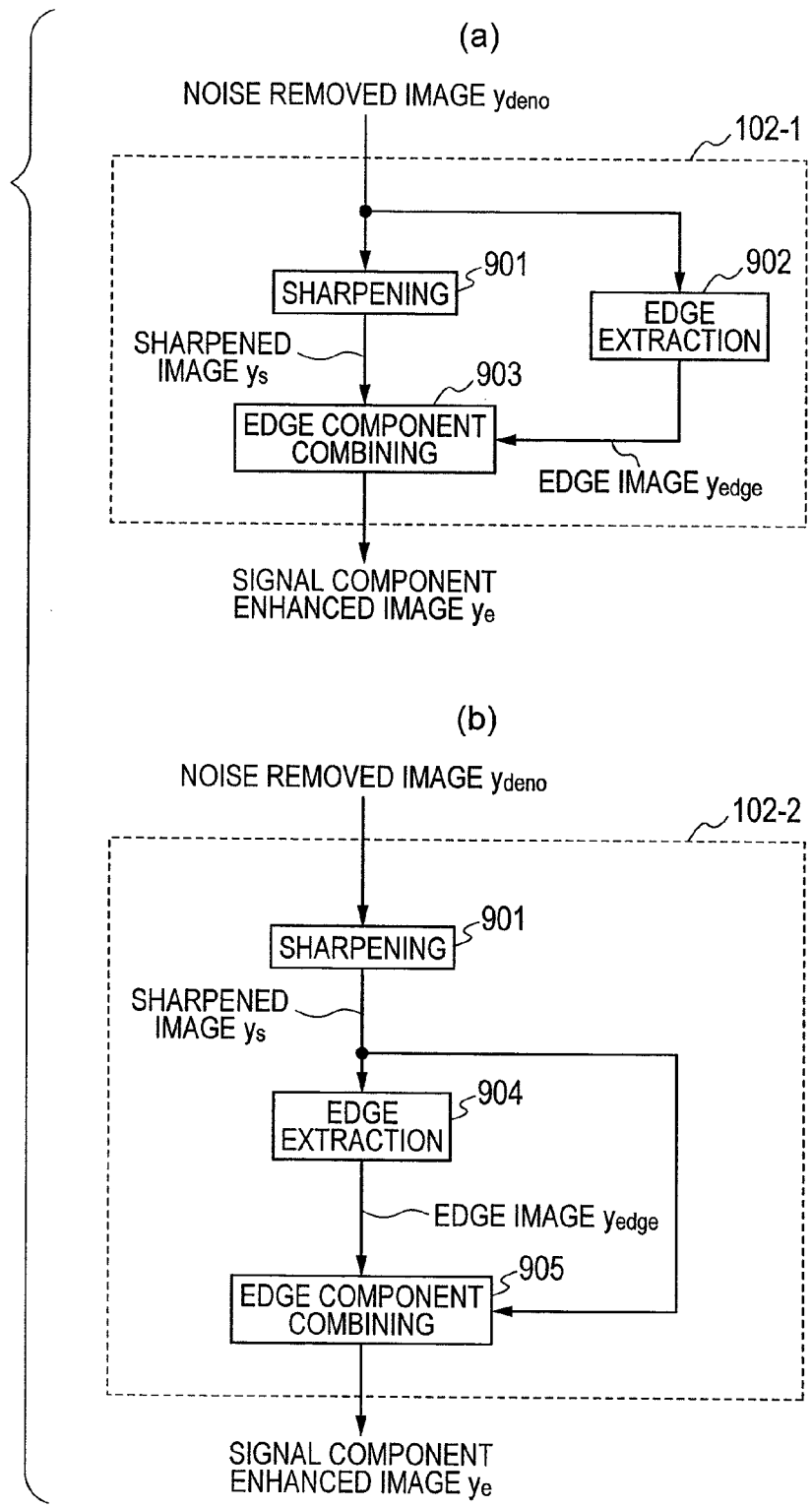
[FIG. 9A] A diagram showing a flow of signal component enhancement processing.
Figure 9B:
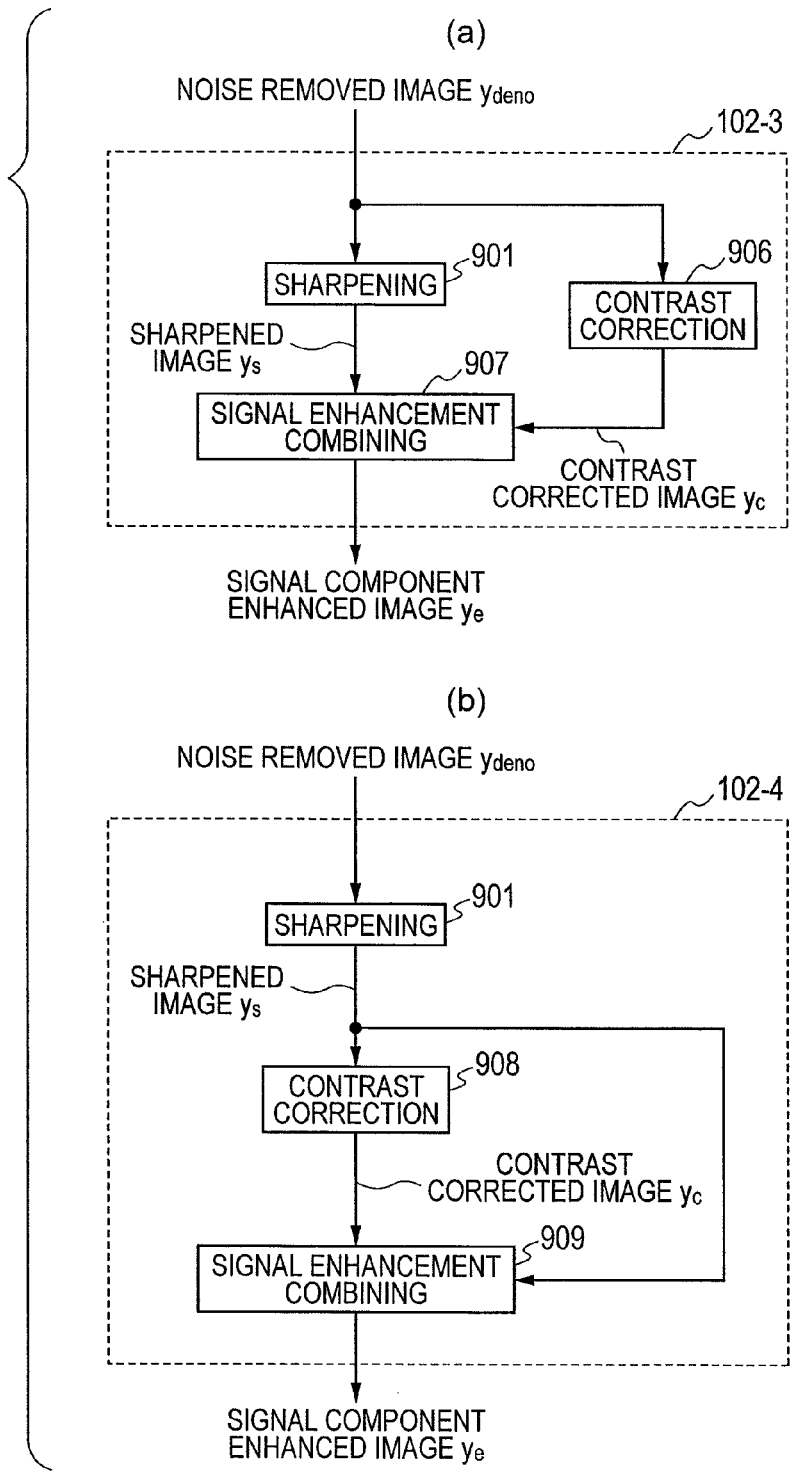
[FIG. 9B] A diagram showing a flow of signal component enhancement processing different from FIG. 9A.
Figure 10:
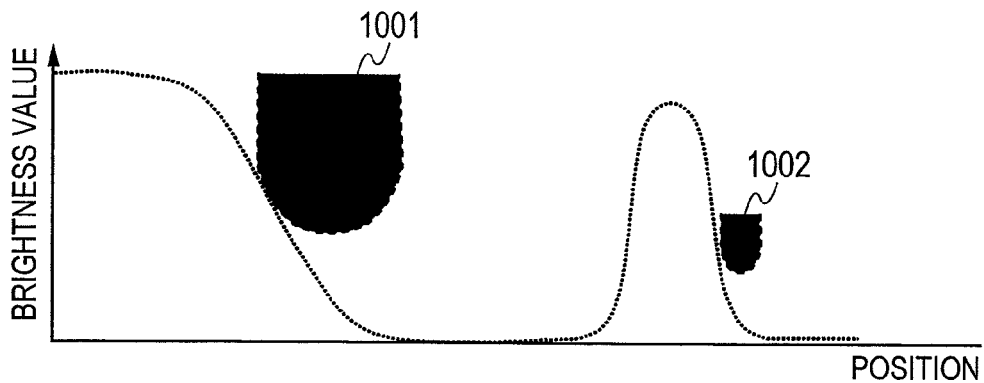
[FIG. 10] A diagram showing an example where the size of a structural element is changed in accordance with image characteristic.
Figure 11:
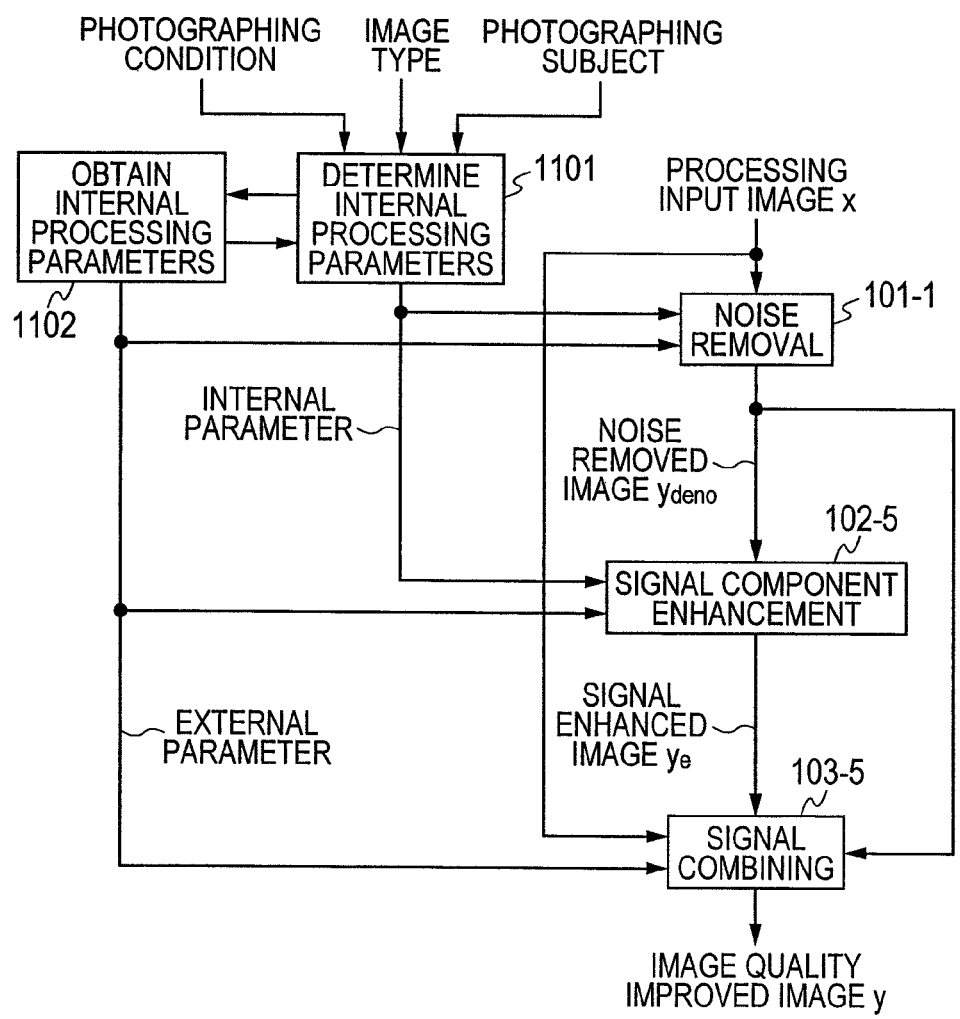
[FIG. 11] A diagram showing a flow of image quality improvement with processing parameters variable in accordance with photographing condition, image type, photographed subject and image characteristics.

21 . . . photographing means, 22 . . . image processing means, 23 . . . display means, 24 . . . control means, 201, 201' . . . medical diagnostic device, 202 . . . transmission circuit part, 203 . . . transmission sensor, 204 . . . reception sensor, 205 . . . reception circuit part, 206, 206' . . . image generation part, 207, 207' . . . image data storage part, 208, 208' . . . image data I/O control part, 209, 209' . . . image data processing unit, 210, 210' . . . preprocessing part, 211, 211' . . . noise removal part, 212, 212' . . . signal component enhancing part, 213, 213' . . . signal combining part, 214, 214' . . . post processing part, 215, 215' . . . scanning conversion part, 216, 216' . . . system control part, 217, 217' . . . image display part, 218, 218' . . . input part, 219 . . . transmission/reception sensor, and 200 . . . transmission/reception circuit part.

The invention claimed is:

1. A medical diagnostic device comprising:
a photographing unit having a transmission sensor and a reception sensor, and photographing a person to be examined to obtain an image of the person to be examined by transmitting an electromagnetic wave or an X-ray or an ultrasound from the transmission sensor and detecting the electromagnetic wave or the X-ray or an ultrasound transmitted through the person to be examined with the reception sensor;
an image processing unit having an image data storage, and processing the image of the person to be examined obtained by the photographing unit;
an image display unit having a screen and displaying the image of the person to be examined processed by the image processing unit on the screen; and
wherein the image processing unit includes:
a noise removal part which removes a noise in the obtained image of a person to be examined; and
a signal component enhancing part which generates an enhanced-signal component image by performing signal component enhancement processing of the obtained image in which noise was removed by the noise removal part, which includes a sharpening process by generating a dilated image and an eroded image by using a morphological filter, calculating weight indexes indicating the degree of dilation for the dilated image and weight indexes indicating the degree of erosion of the eroded image, and performing weighted addition of the dilated image and the eroded image by using the calculated weights and in response to the weighted addition, the generated enhanced-signal component image will comprise three regions: a first region where the brightness value will be the brightness value of the dilated image, a second region where the brightness value will be the brightness value of the eroded image and a third region where the brightness value will be the brightness value resultant of the weighted addition of the indexes of the dilated image and the eroded image.

2. The medical diagnostic device according to claim 1, wherein the image processing unit further performing image combining which generates a combined image by combining through a weighted addition of the obtained image of the person to be examined, the image from which the noise is removed by the image noise removal, and the enhanced-signal component image subjected to signal component enhancement processing, in which weights for the weighted addition are calculated so as to improve image quality according to a naturalness of image determined from standard deviation of the brightness value in a local region of an image and a RMS graininess or Wiener spectrum value.

3. The medical diagnostic device according to claim 1, wherein the image noise removal removes the noise in the obtained image of the person to be examined by using a linear filter, a median filter or wavelet transformation.

4. The medical diagnostic device according to claim 1, wherein the signal component enhancement processing includes sharpening processing and edge extraction processing with respect to the image where the noise is removed.

5. The medical diagnostic device according to claim 1, wherein the signal component enhancement processing generates the signal component enhancement processed image by combining an image obtained by performing sharpening processing on the image from which the noise was removed, and an edge image obtained by performing edge extraction processing on the image from which the noise is removed.

6. The medical diagnostic device according to claim 1, wherein the signal component enhancing part, in calculating weights for the dilated image, in a case that a ratio between the difference in brightness values between the dilated image and the noise removed image and the difference in brightness values between the eroded image and the noise removed image is smaller than a predetermined first value, the weight is determined to a weight by which the dilated image to be a sharpened image and in case the ratio is greater than a predetermined second value, the weight is determined to a weight by which the eroded image to be a sharpened image, and in case other than those the weight is determined as a liner function with respect to the ratio.

7. A medical diagnostic device comprising:
a photographing unit having a transmission sensor and a reception sensor, and photographing a person to be examined to obtain an image of the person to be examined by transmitting an electromagnetic wave or an X-ray or an ultrasound from the transmission sensor and detecting the electromagnetic wave or the X-ray or an ultrasound transmitted through the person to be examined with the reception sensor;
an image processing unit having an image data storage, and processing the image of the person to be examined obtained by the photographing unit;
an image display unit having a screen and displaying the image of the person to be examined processed by the image processing unit on the screen; and
wherein the image processing unit includes:
a noise removal part which removes a noise in the obtained image of a person to be examined; and
a signal component enhancing part which generates an enhanced-signal component of the obtained image by performing signal component enhancement processing of the obtained image in which noise was removed by the noise removal part, which includes a sharpening process by generating a dilated image and an eroded image by using a morphological filter, calculating weight indexes indicating the degree of dilation for the dilated image and weight indexes indicating the degree of erosion of the eroded image, and performing weighted addition of the dilated image and the eroded image by using the calculated weights and in response to the weighted addition, the generated enhanced-signal component image will comprise three regions: a first region where the brightness value will be the brightness value of the dilated image, a second region where the brightness value will be the brightness value of the eroded image and a third region where the brightness value will be the brightness value resultant of the weighted addition of the indexes of the dilated image and the eroded image and a signal combining part which generates a combined image by combining through a weighted addition of the dilated image and the eroded image by using the calculated weights for the dilated image, the image from which the noise is removed by the image noise removal, and the enhanced-signal component image subjected to signal component enhancement processing by the signal component enhancement in which weights for the weighted addition are calculated so as to a sum of the weight for the weighted addition to be a constant value.

8. The medical diagnostic device according to claim 7, wherein the weights for the weighted addition are calculated so as to improve image quality according to a naturalness of image determined from standard deviation of the brightness value in a local region of an image, and RMS graininess or Wiener spectrum value.

9. The medical diagnostic device according to claim 7, wherein the image noise removal removes the noise in the obtained image of the person to be examined by using a linear filter, a median filter, or wavelet transformation.

10. The medical diagnostic device according to claim 7, wherein the signal component enhancement processing includes sharpening processing and edge extraction processing with respect to the image where the noise is removed.

11. The medical diagnostic device according to claim 7, wherein the signal component enhancement processing generates the signal component enhancement processed image by combining an image obtained by performing sharpening processing on the image from which the noise was removed, and an edge image obtained by performing edge extraction processing on the image from which the noise is removed.

* * * * *